(12) United States Patent
Erickson et al.

(10) Patent No.: US 7,895,268 B2
(45) Date of Patent: *Feb. 22, 2011

(54) MULTIPLE PERSPECTIVE ACTIVITY MAP DISPLAY

(75) Inventors: Thomas D. Erickson, Minneapolis, MN (US); Peter K. Malkin, Arsdley, NY (US); Tracee Wolf, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 685 days.

This patent is subject to a terminal disclaimer.

(21) Appl. No.: 09/808,211

(22) Filed: Mar. 14, 2001

(65) Prior Publication Data

US 2002/0133548 A1  Sep. 19, 2002

Related U.S. Application Data

(60) Provisional application No. 60/244,838, filed on Nov. 1, 2000.

(51) Int. Cl.
*G06F 15/16* (2006.01)
*G06F 5/00* (2006.01)

(52) U.S. Cl. ............... 709/204; 709/218; 709/217; 709/223; 345/619; 345/419; 345/427

(58) Field of Classification Search ............ 709/204, 709/220, 223, 224, 217, 218; 715/848, 835; 345/156, 738, 348; 706/45, 59
See application file for complete search history.

(56) References Cited

U.S. PATENT DOCUMENTS

| | | | | |
|---|---|---|---|---|
| 5,745,113 A | * | 4/1998 | Jordan et al. | 715/835 |
| 5,880,731 A | * | 3/1999 | Liles et al. | 345/758 |
| 6,061,716 A | * | 5/2000 | Moncreiff | 709/204 |
| 6,154,212 A | * | 11/2000 | Eick et al. | 715/848 |
| 6,163,799 A | * | 12/2000 | Kambayashi et al. | 709/204 |
| 6,470,383 B1 | * | 10/2002 | Leshem et al. | 709/223 |
| 6,570,555 B1 | * | 5/2003 | Prevost et al. | 345/156 |
| 6,665,715 B1 | * | 12/2003 | Houri | 709/223 |
| 6,708,172 B1 | * | 3/2004 | Wong et al. | 707/10 |
| 6,944,655 B1 | * | 9/2005 | Bellamy et al. | 709/223 |
| 6,970,931 B1 | * | 11/2005 | Bellamy et al. | 709/227 |
| 2002/0049692 A1 | * | 4/2002 | Venkatram | 706/59 |
| 2002/0059395 A1 | * | 5/2002 | Liou | 709/217 |
| 2002/0130899 A1 | * | 9/2002 | Ryan et al. | 345/738 |

OTHER PUBLICATIONS

Ellen Spertus. "Smokey: Automatic Recognition of Hostile Messages". Innovative Applications of Artificial Intelligence (IAAI) '97.

* cited by examiner

*Primary Examiner*—Jude Jean-Gilles
(74) *Attorney, Agent, or Firm*—F. Chau & Associates, LLC

(57) ABSTRACT

A computer-implemented method is provided for representing an environment having at least one aspect. The method includes representing the aspects in an activity map comprising at least two perspectives, and representing a state of a user within the environment as a tangible link between each perspective. The state of the user includes user activity within the environment. The method further includes the step of dynamically incorporating the state of the user in the activity map. The tangible link is a tangible cue which associates perspectives represented by the activity map.

20 Claims, 4 Drawing Sheets

MULTIPLE PERSPECTIVE ACTIVITY MAP DISPLAY

This a non-provisional application claiming the benefit of provisional application Ser. No. 60/244,838, filed Nov. 1, 2000.

BACKGROUND OF THE INVENTION

1. Field of the Invention

The present invention relates to a device and method for displaying an activity map; more particularly, to a device and method for display of activity in a multi-perspective representation of an environment, one including tangible cues linking the representation of each perspective.

2. Background of the Invention

Technology brings people together in the sense that individuals are connected to one another through networks of cellular phones, pagers, personal digital assistants, computers, etc. In particular, in the area of online interaction, there are several efforts working towards creating a computer interface capable of displaying intangible qualities typically associated with live interaction. For example, MICROSOFT's® hierarchical file system interface, Babble, usage summaries for web sites, and The Palace (www.thepalace.com). These systems include elements which relate to attributes normally associated with a physical interaction. For example, by posting the number of visitors to a web site (e.g., usage summaries), a consumer can have a feeling of belonging to a larger group of people interested in that web site. These and other systems are described below.

FTP allows online users to have access to a collection of documents; one or more users being authorized to add documents to the collection. Although a user may access data provided via FTP, the user is not provided with any way to see what other users are doing. Only the current data is available. (See Ed Krol, *The Whole Internet Catalog*. O'Reilly and Associates, Inc. Sebastopol, Calif. 1992.)

NNTP or network news, provides a venue in which users can asynchronously post messages and responses into administered news groups (i.e., predefined groups of messages which are meant to relate to specified topics, e.g., all articles in alt.sport.soccer should deal with soccer). Here again, a user is only able to see the data, news group messages, posted by other users. No interface is provided which allows a user to see what other users are currently connected, or what other users have read.

Internet Relay Chat (IRC) is similar to NNTP in that it allows consumers to post messages and responses in pre-defined topic areas—called channels in IRC. The main difference with IRC is that the interactions are synchronous rather than asynchronous as in NNTP. Although with IRC a user is often given a list of the other currently operational users, they are not shown any other information about their co-chatters other than the messages they post.

Loom, a visualization tool for Usenet (NNTP) news groups, provides a technique for displaying the emotional mood (e.g., hostile, happy) of an NNTP-based online community (e.g., a Usenet news group) by analyzing the content of its interactions. Although this utility can analyze online interactions and provide a graphical representation of aspects of the interactions, it provides a representation of only one aspect (e.g., the emotional mode) of the online environment (e.g., a given news group). It does not provide a representation of more than one aspect of a given environment, nor does it provide tangible cues indicating the relationship between the representations. (See Judith Donath et al. "Visualizing Conversation" published in the *Journal of Computer Mediated Conversation*. Volume 4, number 4, June 1999.)

Babble provides dynamic indicators of the presence and activity of all operational users with respect to the available topics (e.g., discussion areas created by the consumers). These indicators are computed using the activities of the participants, such as, connections, postings, and topic switches. Similar to Loom, although Babble provides a representation—one that is dynamically updated—of one aspect of an environment, neither does it provides representations of multiple aspects of a given environment, nor does it provides tangible cues indicating the relationship between the representations. (See Thomas Erickson, et al. "Socially Translucent Systems: Social Proxies, Persistent Conversation, and the Design of 'Babble.'" published in *Human Factors in Computing Systems: The Proceedings of CHI '99*. ACM Press, 1999.)

Online games, like chess and bridge (e.g., Chessmaster 6000 by Mindscape, Inc.), provide environments in which multiple users can participate. Although such games provide representations of multiple aspects of the environment, e.g., a view of the current position of all of the chess pieces, along with a view of a timer indicating how long the current player has to execute their next move; no tangible cues are provided linking the multiple representations.

Thus, currently no system or method exists for simultaneously displaying multiple aspects as tangibly linked perspectives of an environment or community. Therefore, a need exists for a system and method for implementing a graphical on-line environment having multiple aspects displayed as tangibly linked perspectives including groups of users and their interactions with others.

SUMMARY OF THE INVENTION

According to an embodiment of the present invention, a computer-implemented method is provided for representing an environment having at least one aspect. The method includes representing aspects in an activity map comprising at least two perspectives, and representing a state of a user within the environment as a tangible link between each perspective.

The state of the user includes user activity within the environment. The method further includes the step of dynamically incorporating the state of the user in the activity map. The state of the user includes one of a user location, a user status within a hierarchy, a user emotion, and a quality of user conversation.

The tangible link is a tangible cue which associates perspectives represented by the activity map. The tangible link is a tangible visual cue. The tangible link is one of a tangible aural cue, and a tangible tactile cue.

The activity map includes a geographic perspective and a discussion perspective, the two perspectives associated by the user state within the environment. The discussion aspect includes at least one topic, and links the activity map to a second activity map representing the topic in at least two perspectives.

Each perspective is one of a representation of the user state, and a representation of user input to the environment. The environment is a transactional environment.

According to an embodiment of the present invention, a program storage device readable by machine is provided, tangibly embodying a program of instructions executable by the machine to perform method steps for interacting with an environment having an aspect, the method steps including representing the aspect in an activity map including at least two perspectives, representing an activity of a user within the environment, and representing the activity of the user as a tangible link between each perspective.

The environment is a transactional environment and the user is a market participant. The activity map includes at least one perspective in which an on-line transaction is conducted.

The tangible link is a tangible cue which associates the perspectives. The tangible link is a tangible visual cue.

A single perspective incorporates more than one aspect. The aspect may be represented by more than one perspective.

According to an embodiment of the present invention, a computer-implemented method is provided for representing a transactional environment having aspects. The method includes representing an aspect in an activity map comprising at least two associated perspectives, wherein the perspectives are associated by a market participant, providing at least one perspective in which an on-line transaction is conducted between at least two market participants, and representing the market participants within the activity map.

Perspectives of the activity map are associated by market participant activity. The association between perspectives is represented as a tangible link connecting perspectives. The transactional environment is one of a business, a market place, and an auction house.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
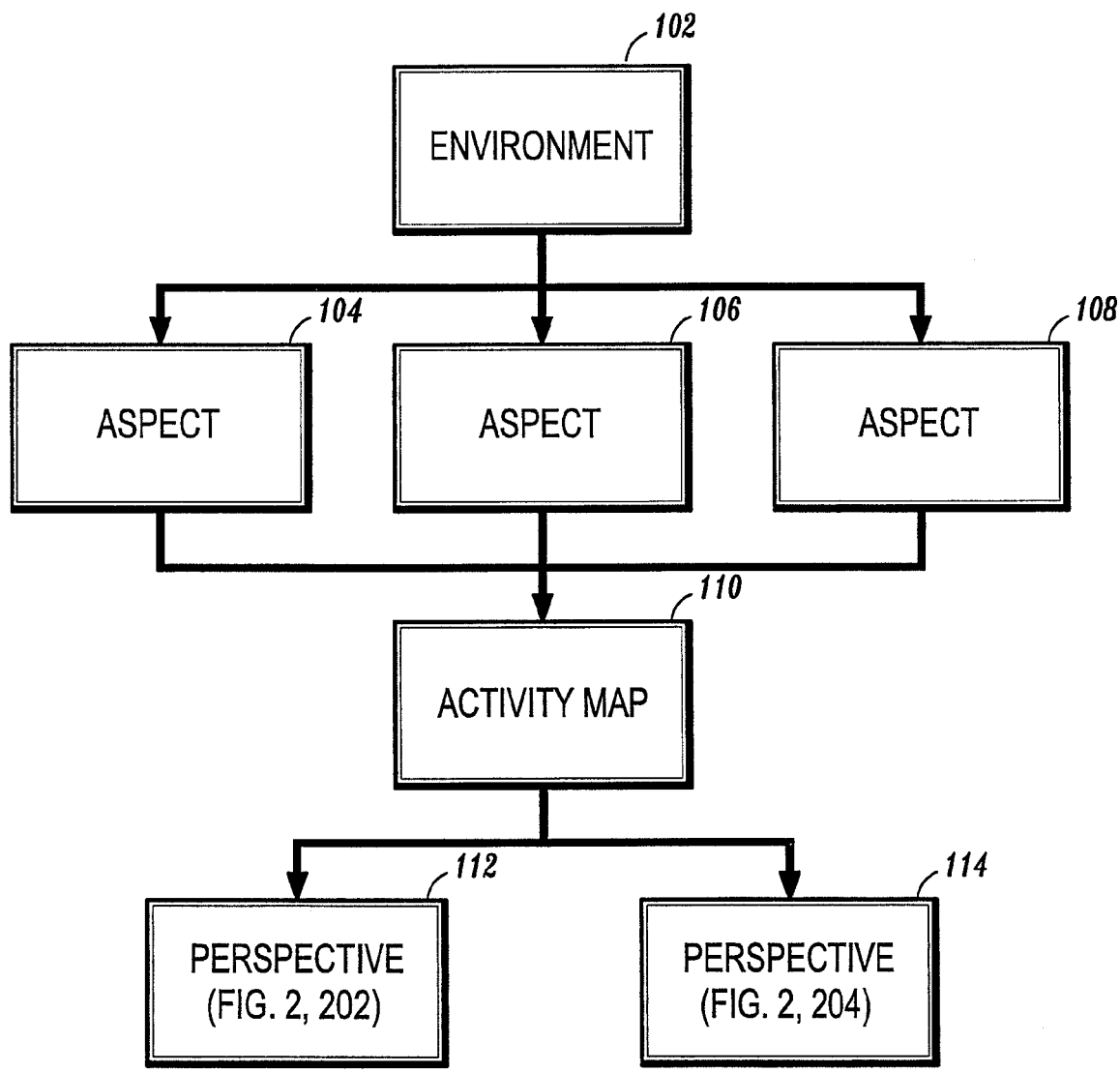
FIG. 1 is a block diagram of a data model according to the present invention.

An activity map is a graphical display representing the activity of participants located within a multi-aspect representation of space (either a "real" or a virtual space). As participants (for example, depicted individually as dots or collectively as spots) carry out their activities within the mapped space (environment), the activity map changes to reflect the current state of the environment. Because different perspectives of the same activity map are based on the same or similar information, the perspectives are associated with each other.

According to the present invention, an activity map functions as a macro-social proxy for distributed users, that is, a social proxy simultaneously representing activity in several conversation topics. The present invention also contemplates applications directed towards geography (both macro and micro, e.g., within a building), organizational structures (e.g., managerial hierarchies, document outlines, etc.), virtual spaces, visceral properties such as the tone of a discussion between users, etc.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The abstract graphical representation of a user or the user's environment is called a social proxy. A social proxy can show presence of users and objects in a physical or virtual space. Further, a social proxy can represent user activity, including degree of activity, and activity with respect to others and/or shared resources. Therefore, social proxies can also be provided for dynamic environments as well as for users. Commonly assigned application Ser. No. 09/541,804, filed Apr. 3, 2000, describes social proxies in detail, the disclosure of which is incorporated-by-reference in its entirety herein. Systems which provide perceptually-based social cues, affording user awareness, are socially translucent systems.

One embodiment of the present invention provides an activity map for conveying a feeling of aliveness, to make participants feel that they are part of a larger unit, group, or discussion. The activity map is one type of social proxy. By displaying a high level picture of activity through, for example, an activity map, participants can be drawn in and engaged. Thus, the activity map can support community-building social processes (for example, imitation, peer pressure, identity, friendly rivalry, and feelings of belonging). In addition, information about the number of participants and their activities can be conveyed with text and statistics. By providing a visual representation of such activity, a visceral appeal can be achieved to replace or supplement a textual representation.

Activity can include, but is not limited to, simple user participation, e.g., connecting to the system, switching from one conversation topic to another, or making a posting. Activity can also include a measure of a given user's emotional state, e.g., measured by how often their posting are hostile (e.g., flames), the automatic detection of such postings being well know in the art. Note that a given user's level of activity can be measured according to when they last performed a given act. E.g., Charlie is very active since he just switched into a new topic, while Mary is less active because she has been inactive for four minutes; Burt is completely inactive since he hasn't done anything for ten minutes.

FIG. 1 outlines a data model according to an embodiment of the present invention, such that an environment 102 may have several aspects 104-108. Aspects are represented by an activity map 110 and displayed in two or more linked or associated perspectives 112-114. A single perspective may incorporate more than one aspect. An aspect may be represented by more than one perspective.

Figure 2:
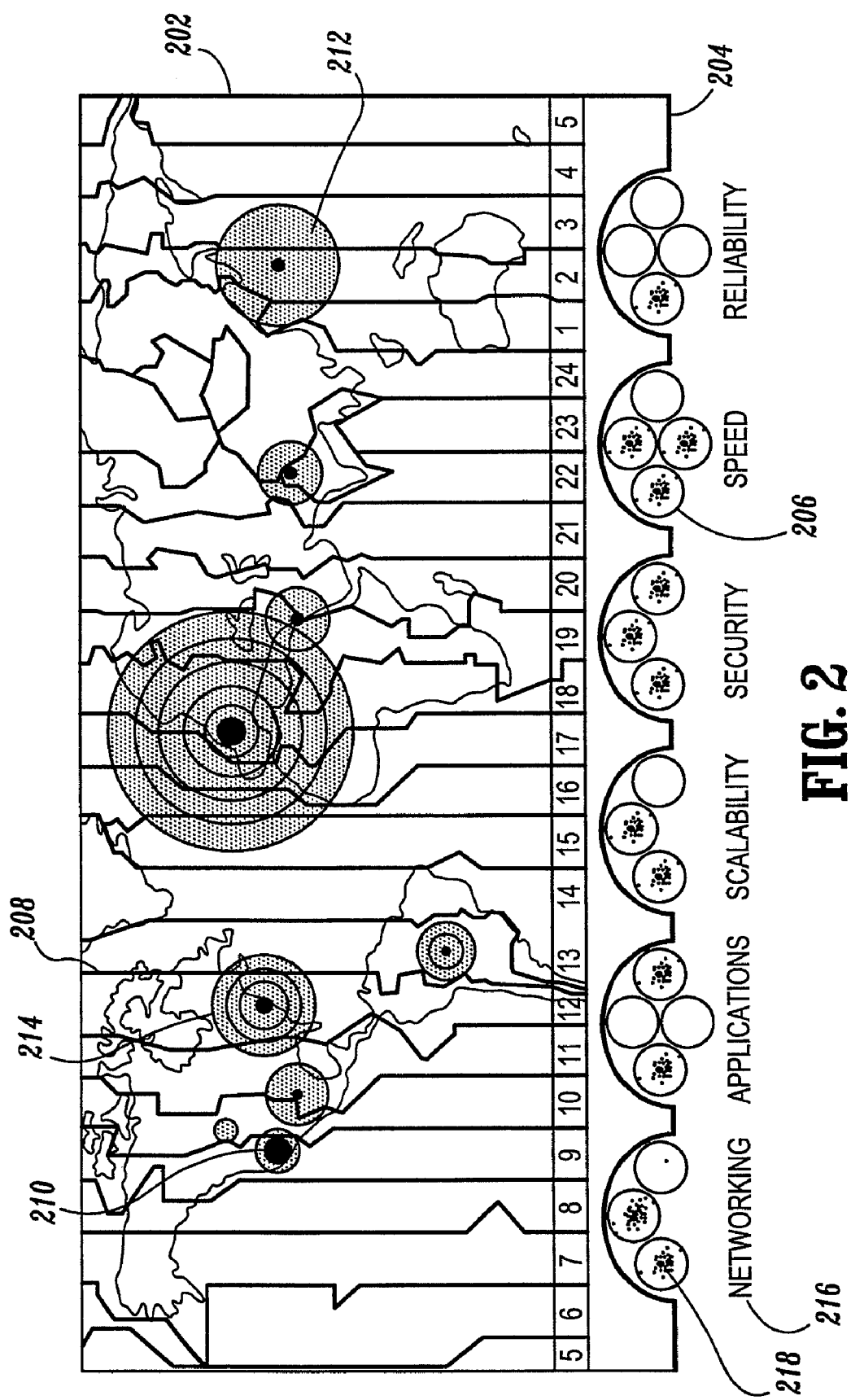
FIG. 2 is an illustration of an activity map according to one embodiment of the present invention.
Figure 3:
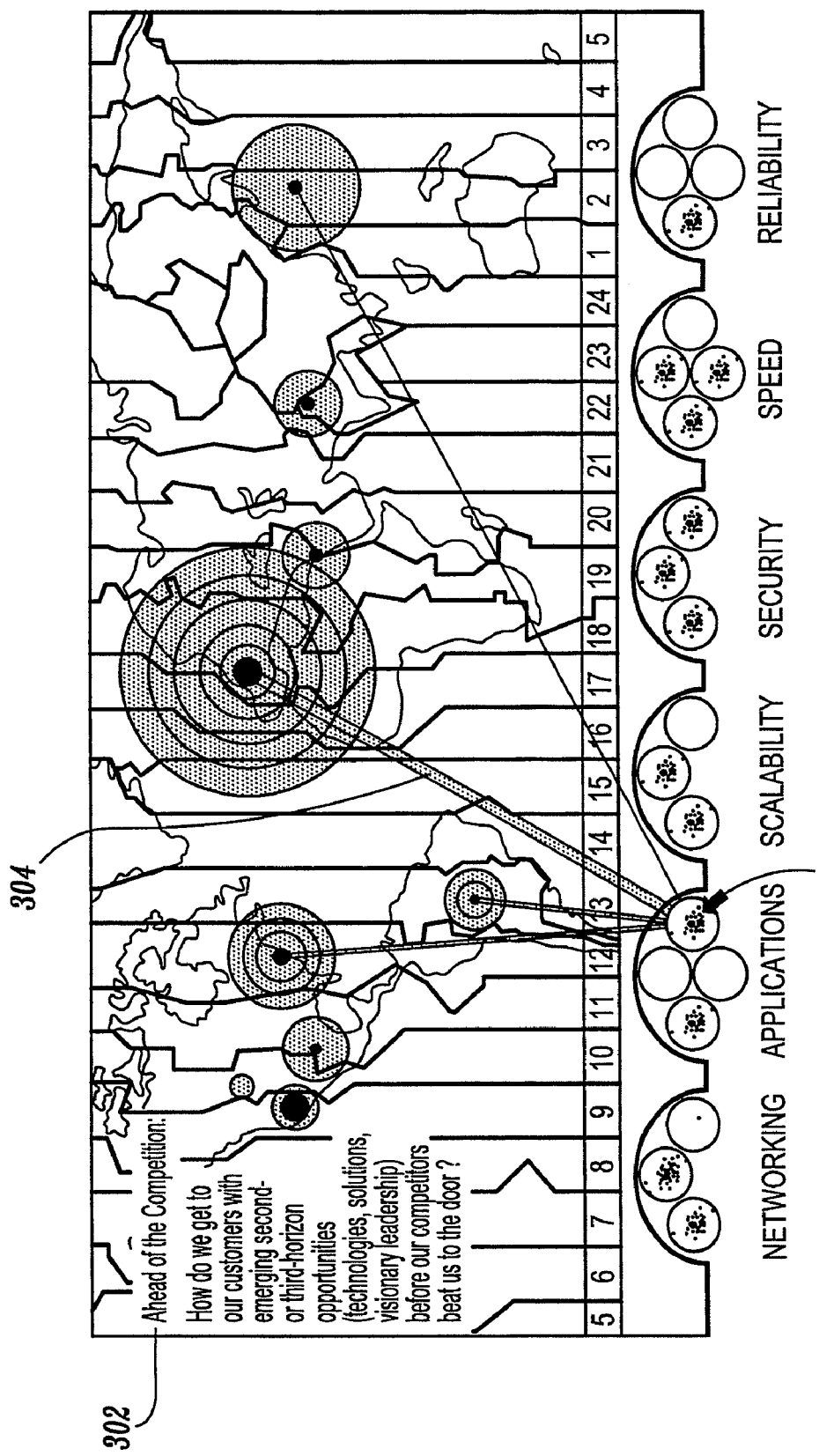
FIG. 3 is another illustration of an activity map according to one embodiment of the present invention.

FIGS. 2 and 3 illustrate examples of preferred embodiments according to the present invention. The upper part of the map 202 provides a geographic view of an environment: it shows how many participants from various regions are engaged (now and/or cumulatively). Thus, the single perspective 202 incorporates two aspects, a geographic aspect and a level of user participation aspect. The lower part of the map 204 provides a discussion view; it shows how many participants are in each of the twenty-one topics or themes (e.g., 206). Rollover-triggered animation and textual flyouts (302 and 304) can provide more information throughout the map.

According to an embodiment of the present invention, a single, high level representation of dispersed activity is provided. Thus, a user can see at a glance that the activity is, for example, a world wide event, and that participants from various regions are engaged. The representation is designed to be intuitive, imparting information through graphics and/or text.

In a preferred embodiment of the invention, the activity map represents at least two aspects of an environment, providing answers questions such as: how many participants are engaged in the system; from where are they participating; how many participants have been engaged so far; where are participants congregating (or not); are lots of participants talking; what regions are the participants from; etc. Preferably, an activity map includes two components, a first representing a geographic aspect of an environment and a second representing a discussion aspects of the environment. Other configurations are contemplated, and can depend on the environment or aspect being represented. For example, for a group of consumers seeking to purchase an IBM Web-hosting appliance, an activity map can be provided including a systems diagram perspective of the particular server and representations of individual users grouped according to the components of the appliance which interest them. In addition, the activity map can be implemented in a hierarchical structure, for example, the Web-hosting appliance perspective can be embedded in a larger activity map of the manufacturer as a whole.

Referring to FIGS. 2 and 3, the geographic perspective 202 of the activity map included in an upper portion of the map shows the distribution of activity over a geographic area (e.g., the world). The geographic perspective 202, or world map, is divided into time zones 108, and shaded to show the shift from day to night. The central spots 210 indicate the number of participants currently connected from a particular region. The central spots can be distinguished by, for example, color, shade, pattern, etc. The "halo" (e.g., 212) around the central spots represent cumulative activity. Ripples (e.g., 214) radiate from each central spot, signifying the amount of "talking" being done by participants from those regions. Positioning a cursor 306 (e.g., any pointing/selecting means) over any central spot can initiate a textual flyout (e.g., 302) containing information such as what the region actually is and the number of participants. The above elements are intended to illustrate an embodiment of the present invention, however, it will be apparent that each of the above elements, as well as similar elements, can be added or subtracted from a given activity map depending on the application of the methods.

The discussion perspective depicted in FIGS. 2 and 3, is included in a lower portion of the map 204, and shows the distribution of activity across different discussion topics or themes, e.g., 216. Topic circles, e.g., 206, are grouped according to discussion topic or theme, e.g., NETWORKING 216. Each topic circle within a topic or theme can represent a group of users and/or a sub-topic under the heading of the main topic or theme. Within each topic circle (e.g., 206) black dots 218 represent participants or groups of participants. Each dot's proximity to the center of the circle is proportional to how recently the individual contributed to the topic, for example, a cluster of dots (e.g., 218) in the middle of a topic circle has conversation happening "now," thus, a topic with a greater number of participants contributing to the conversation will have a dense group of dots.

In one embodiment of the present invention, when the user positions a cursor 306 over a topic circle associated with "APPLICATIONS", lines (e.g., 304) of different widths appear connecting the topic circle to the geographic regions from which the participants come, the width of each line indicating the number of participants from the linked region. Thus, a user, provided with such a dynamic representation of an environment, and is able to discern multiple qualities of the environment from a single display. The linking of two perspectives through visual cues and text is an efficient means for conveying information. The conveyance of information promotes conversation and ad hoc communities can even form. This is advantageous for a given business, furthering mindsharing, that is, making ideas widely available for adaptation, comment, criticism, etc.

The presentation of information in a linked display of at least two perspectives of an environment provides a user with a perception that has heretofore not been available. For example, product marketers and analysts can track the geographic sources of particular customers interests, e.g., that the security related topics are extensively used by customers in Europe, while there is only limited use from the U.S. Inferences can readily made, e.g., even though the U.S. security image is good, the image in Europe can be improved. More detailed analysis of the types of security problems are also possible, for example, to determine particular European security concerns. Business personnel can join conversations to address apparent product weaknesses. Using the example above, the business personnel can join the security related conversations to provide additional assurances for to European customers.

Because different perspectives of the same activity map are based on the same or similar information, the perspectives are associated with each other. For example, FIG. 2 shows two perspectives 202 and 204, linked be user activity. Further, links can be represented visually, for example, line 304 of FIG. 3.

According to one embodiment of the present invention, a user can uniquely identify each participant and obtain information, such as, the users location, resume, a list of posted comments, etc. In addition, the present invention is scaleable, able to deal with thousands of participants in a topic where, for example, one dot equals many participants. In one embodiment of the invention, an individual's activity can be mapped back to the global activity map.

An activity map can represent an environment for the transaction of business as well as social interaction. As a medium for the representation of a financial transaction, an activity map can provide information about a product or service through the use of perspectives dedicated to information provided by the business and consumer activity. In an embodiment of the present invention, consumer activity can be used, for example, by grouping consumers according to needs, a business can host informal information exchange between consumers. Further, by providing in a transactional perspective of the activity map which provides a product or service to a consumer, a business can link the information exchange of an activity map to a sales environment. A transactional perspective can include, for example, order forms, shipping options, security information and payment plans.

The following embodiment of the present invention will now be described with respect to FIG. 4. A topic perspective 402 is provided for representing a topic and its activity in graphical form. The topic perspective 402, one perspective of the activity map 404, provides a variety of information such as how many participants are here, how many have been active recently, how many breakout discussions or sessions are going on now, etc. The topic perspective 402 can make it feel like a lively, interesting place. The perspective 402 can also give some feeling for the nature and content of the discussion that is taking place. Preferably, a participant, upon selecting a topic, is provided with information about the topic, for example, statistics including the number of participants, perceived mood of the participants engaged in that topic as a group based on the participants "tone", and the perceived mood of an individual participant based on that participant's contributions to the topic, e.g., whether the contributions are heated, neutral, etc.

Figure 4:
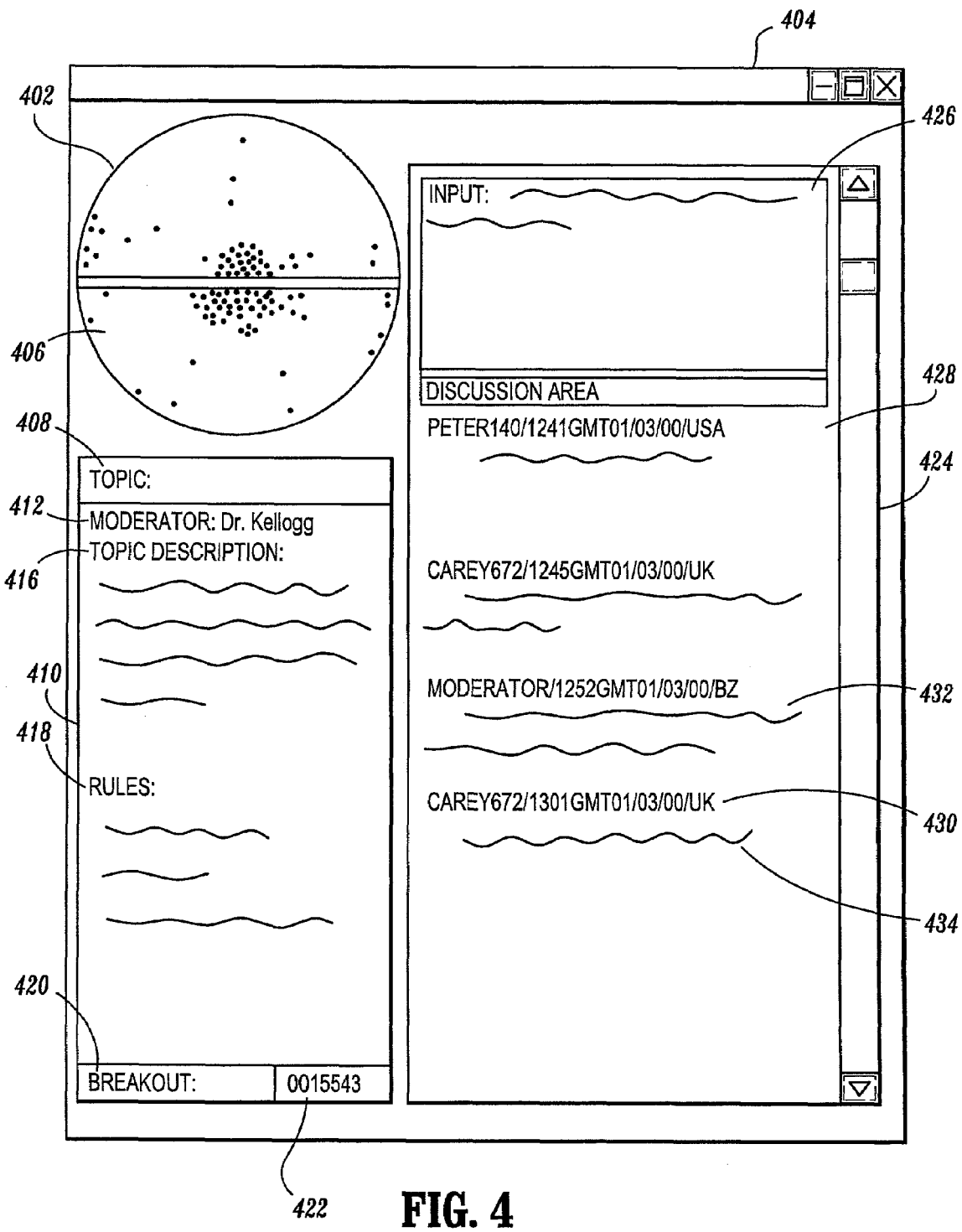
FIG. 4 is an illustration of a topic map according to yet another embodiment of the present invention.

FIG. 4 shows an example of a topic perspective 402, embedded in a topic page 404 (an example of an activity map). This particular example shows the number of participants in the topic in general, and the number of participants currently involved in breakout discussions in the lower half of the circle 406. The closer the dot is to the center of the circle, the more recently that participant has contributed a comment. That is, when a participant makes a comment, his or her dot will move into the center of the screen; as they are idle, the dots slowly drift out to the edge of the screen. Thus, the topic perspective is linked to a textual perspective (e.g., 410 and 424).

In an embodiment of the topic page, a topic perspective 402 is provided in the upper left corner, showing the title of the topic 408 followed by an area 410 in which a moderator 412 can post items 414 that remain visible on the page (e.g., the topic description 416, a list of rules for guiding the discussion 418, etc.). The stylized lines, e.g., 434, represent text entered by a user or the moderator. At the bottom left is a button 420 for accessing breakout sessions that are "recruiting" members and a counter 422 showing the number of sessions that have happened. The right half of the page 424 is devoted to the conversation itself, with an input area 426 at the top, and the general discussion area 428 below. Within the discussion area, each comment has a tag 430 which can include name, global time stamp, local time stamp, etc. In addition to the moderator's special area, he or she can also add comments directly to the discussion 432. These can be shown in a color or font to distinguish the moderator from the other contributors. In addition, remarks can be categorized by, for example, the moderator. These categories or "buckets can include, among other things, "key questions", critical success factors", "war stories", etc. In addition, these categories can serve as the basis of new topic perspectives.

Further, the topic perspective 404 can be linked to another activity map. For example, the topic page 404 can be a detailed perspective of a topic circle (e.g., 206 in FIG. 2). Activity maps in the same environment and activity maps of different environments can be linked by user activity.

In another embodiment of the present invention an archive map is provided, similar to an activity map. An archive map can reveal the amount of interest that the particular conversation has generated by making previous activity maps available to users from a storage medium such as a database server. Seeing that participants are accessing the ideas generated, and seeing which topics are accessed, can provide a direct indication of the value of the topics or themes. Furthermore, by allowing participants to see how many participants are accessing what parts of the archive (and when), the archive map can serve as a barometer of interests and needs. Thus, it is preferable to provide at least one component of an archive map that records ongoing interests in a topic or group of topics.

An archive map can also serve as a focus for further activity and discussion. That is, because a particular topic is likely to attract participants with similar interests and needs, those accessing the same topic in the archive could see one another and strike up a discussion (either synchronously with chat, or asynchronously via discussion). The archive map can serve not just as a knowledge base, but as a place where participants with similar interests can encounter one another. Indeed, by storing the discussions among archive participants, the discussions become part of the archive themselves. In the present embodiment, an activity map, rather than just the being a short term event, is a starting point for a multitude of long term discussions, creating an ever growing database of ideas.

As such the archive map preferably includes at least two uses, an archive map as barometer, and archive map as knowledge community. The archive map can reflect the amount of information contributed in one perspective and provide summaries of topics determined by data mining, or manually generated be moderators in another perspective. Dots within the topic circles reflect those currently accessing the archives, and shows cumulative interest over time.

A second feature of the archive map links an active perspective to archived perspectives, and thus supports persistent asynchronous discussion (that is, without moderators and breakout discussions) about the content of the archive map. This is organized depending on what is produced in various topics. One embodiment of the present invention includes moderators for identifying various issues that the participants in the active perspective can discuss or add to (e.g., essentially defining a new set of topics based on the original topics or themes). In one embodiment of the present invention, participants create their own topics in the active perspective, in the hope of attracting others to address their particular needs.

Although the tangible cues (304) described in the preferred embodiment are graphical, those with regular skill in the art will appreciate that such cues could also be auditory or tactile. For example, referring to FIG. 3, each geographic region could have the sound of a particular musical instrument associated with it (e.g., piano relates to Eastern United States), and when a given user positions a cursor 306 over a topic circle associated with "APPLICATIONS", the sounds associated with the geographic regions from which the participants come will play. The volume of each sound may indicate the number of participants from the linked region. Similarly, tactile cues may be provided, since the sounds associated with the geographic regions could be chosen so that are discernible by a user who is touching the diaphragm of the speaker producing the sound. For example, using only the sense of touch one can distinguish between the vibration produced by a cymbal crash from that made a low base note. Thus the user could feel the notes produced by the links to relevant geographic regions rather than hear them.

Having described embodiments of a system and method for a distributed social proxy, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set forth in the appended claims.

What is claimed is:

1. A computer-implemented method for representing user activity within an environment comprising the steps of:
displaying an activity map comprising at least two perspectives of the environment, wherein each perspective is an abstract graphical display of at least one aspect of the user activity within the environment;
selecting an element of a first perspective, wherein the element of the first perspective is an abstract graphical display of a first predefined characteristic of the user activity within the environment; and
displaying a graphic link having a first end point at the element of the first perspective and a second end point at at least one element of a second perspective and representing an association between the element of the first perspective and the at least one element of a second perspective, wherein each element of the second perspective is an abstract graphical display of a corresponding predefined characteristic of the user activity within the environment.

2. The computer-implemented method of claim 1, further comprising the steps of:
determining a value of at least one predefined characteristic of the user activity; and
dynamically incorporating the value of the at least one predefined characteristic of the user activity in the activity map.

3. The computer-implemented method of claim 1, wherein each predefined characteristic of the user activity includes one of a user location, a user status within a hierarchy, a user emotion, and a quality of user conversation.

4. The computer-implemented method of claim 1, wherein the graphic link associates the at least two perspectives of the activity map.

5. The computer-implemented method of claim 1, wherein the graphic link is a line linking a user's activity represented separately in the at least two perspectives of the activity map, wherein the at least two perspectives of the activity map are non-overlapping.

6. The computer-implemented method of claim 1, wherein the activity map includes a geographic perspective and a discussion perspective, the two perspectives associated by the user activity within the environment.

7. The computer-implemented method of claim 6, wherein the discussion perspective includes at least one topic, wherein each topic is an element.

8. The computer-implemented method of claim 1, wherein each perspective is one of a representation of the user activity, and a representation of user input to the environment.

9. The computer-implemented method of claim 1, wherein the environment is a transactional environment.

10. A program storage device readable by machine, tangibly embodying a program of instructions executable by the machine to perform method steps for interacting with an environment having an aspect, the method steps comprising:
representing the aspect in an activity map including at least two perspectives of the aspect;
representing an activity of a user within the environment, wherein the activity corresponds to the aspect and is represented in each perspective separately; and
representing the activity of the user as a line rendered between each perspective of the aspect.

11. The program storage device of claim 10, wherein the environment is a transactional environment and the user is a market participant.

12. The program storage device of claim 10, wherein the activity map includes at least one perspective in which an on-line transaction is conducted.

13. The program storage device of claim 10, wherein the line rendered is a tangible cue which associates the perspectives.

14. The program storage device of claim 10, wherein the line rendered is a line linking a user's activity represented separately in the at least two perspectives of the activity map, wherein the at least two perspectives of the activity map are non-overlapping.

15. The program storage device of claim 10, wherein a single perspective incorporates more than one aspect.

16. The program storage device of claim 10, wherein the aspect may be represented by more than one perspective.

17. A computer-implemented method for representing a transactional environment having aspects comprising the steps of:
displaying at least one different aspect of user activity in each of at least two perspectives of an activity map, wherein the perspectives are associated by the user activity of a market participant, wherein an association between perspectives is represented as a tangible link connecting perspectives, wherein the tangible link is a line having ends points at aspects of the user activity of the market participant represented separately in the at least two associated perspectives of the activity map;
providing at least one perspective in which an on-line transaction is conducted between at least two market participants; and
representing the market participants within the activity map.

18. The computer-implemented method of claim 17, wherein perspectives of the activity map are associated by market participant activity.

19. The computer-implemented method of claim 17, wherein the transactional environment is one of a business, a market place, and an auction house.

20. The computer-implemented method of claim 17, wherein the at least two perspectives of the activity map are displayed as non-overlapping abstract graphical displays.

* * * * *